Patented July 16, 1946

2,404,220

UNITED STATES PATENT OFFICE 2,404,220

COPOLYMERS OF DIVINYL BENZENE AND VINYL ACETATE

Gaetano F. D'Alelio, Pittsfield, Mass., assignor to General Electric Company, a corporation of New York No Drawing. Application June 23, 1942, Serial No. 448,156

3 Claims. (Cl. 260—86)

This invention relates to the preparation of synthetic resin compositions and more particularly to the preparation of heat-convertible, soluble, fusible copolymers of divinyl benzene.

It is known that polymerization of compounds possessing more than one terminal $CH_2=C<$ grouping, providing the system is not conjugated, results in the formation of a cross-linked, insoluble, infusible polymer. Examples of such compounds are glycol dimethacrylate, diallyl succinate, diallyl phthalate, diallyl maleate, allyl acrylate, diallyl oxalate, dimethallyl ether, etc. Likewise, such polymers as a rule are rather brittle and low in flexural and impact strength. Also, copolymers made with such compounds containing more than one $CH_2=C<$ group are infusible and insoluble to a degree proportional to the amount of compound containing a multiplicity of $CH_2=C<$ groups. Such copolymers cannot be molded once formed or cast. Divinyl benzene polymerized in the usual manner acts in the same fashion. When this compound is polymerized an insoluble, very hard, infusible, nonworkable mass is obtained. Copolymers of divinyl benzene which are known are insoluble and infusible. Although the copolymeric products of this invention are fusible and soluble, it is a unique property of these copolymers that they possess heat-convertibility and may, therefore, be converted to an infusible, insoluble material.

I have now discovered that divinyl benzene may be partially copolymerized to a soluble and fusible heat-convertible copolymer mass, thus making available for commercial use a product heretofore inapplicable. The process by which a soluble, fusible partial polymer of divinyl benzene may be isolated from a dialkyl benzene having at least two carbon atoms in each alkyl grouping comprises polymerizing the solution of divinyl benzene in a dialkyl benzene in the presence of both a vinyl-type compound, which acts as an inhibitor, and a catalyst of polymerization, for a time less than that required to cause separation of the polymer. The dissolved partial polymer is then precipitated by the addition of a non-solvent or by evaporation of the volatile constituents.

Present production of divinyl benzene (monomer) is carried out in such a manner that the resulting product is an inseparable mixture of about 20–30% divinyl benzene in diethyl benzene. The present invention is of special interest because it utilizes this inseparable mixture for which there has been no use up until the present time.

Extensive experiments carried out on the polymerization of divinyl benzene in a dialkyl benzene indicate that an insoluble, infusible resin is obtained as a gel when ordinary polymerization methods are employed. This gel formation or precipitation takes place in a very short time, e. g., 15–20 minutes. The extreme sensitivity of this resin precludes its use in industrial applications. By means of this invention I may cause the copolymers to be formed at a much slower rate, thus providing a greater permissible deviation from any calculated time required to give a maximum yield of partial polymer. The time required depends upon the type as well as the amount of vinyl compound and catalyst present in the solution. I have found that, by varying my conditions, a partially polymerized product may be obtained in whatever time is desired. This behavior is entirely unexpected and unpredictable as can be seen from the following examples. In particular in Example 1 the divinyl benzene solution containing 50 parts divinyl benzene and 0.5 part benzoyl peroxide gelled in 17 minutes and, whereas the vinyl acetate containing the varied quantities of benzoyl peroxide given in that example polymerizes with almost explosive violence at reflux temperatures, the mixture of the two had an increase in gelation time from 17 minutes, through 30 and 60 minutes all the way to 240 minutes.

The actual polymerization of the divinyl benzene in its solution in a dialkyl benzene is carried out as previously indicated in the presence of both a catalyst and an inhibitor of polymerization. Any suitable method may be employed. However, I prefer to cause polymerization under the influence of external heat in the presence of a catalyst for a period substantially less than that required to cause gelation of the solution. For purposes of economy and convenience I prefer to use reflux temperature and atmospheric pressure although other elevated temperatures and pressures ranging from subatmospheric to superatmospheric pressure may be used. The partial copolymer of divinyl benzene may be precipitated from the dialkyl benzene by the addition of some non-solvent, e. g., methyl alcohol, ethyl alcohol, glycol, etc.

For polymerization catalysts in the polymerization of divinyl benzene I may use ozone, ozonides, inorganic super oxides such as barium peroxide, sodium peroxide, etc., aliphatic acyl peroxides, e. g., acetyl peroxide, lauryl peroxide, stearyl peroxide, etc., peroxides of the aromatic acid series, e. g., benzoyl peroxide, etc., ketone peroxides, e. g., acetone peroxide, triacetone peroxide, alkyl derivatives of hydrogen peroxide, e. g., ethyl hydrogen peroxide, diethyl peroxide, etc., mixed organic peroxides, e. g., acetyl benzoyl peroxide, etc., various per compounds such as perborates, persulfates, perchlorates, etc., aluminum salts such as the halides, e. g., aluminum chloride, organic and inorganic acids such as methacrylic, hydrofluoric, etc., metal compounds of the unsaturated acids as, for instance, cobalt and manganese resinates, linoleates, maleates, etc., hydrogen peroxide, etc. However, benzoyl peroxide is a preferred catalyst. Any suitable amount of catalyst may be used but, in general, the catalyst concentration will be within the range of 0.1–2.0% by weight of divinyl benzene.

As inhibitors in the preparation of the partial polymerizates of this invention I may use with divinyl aryl derivatives compounds of the type

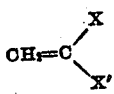

where X is a member of the class consisting of hydrogen and halogen and alkyl, aryl, carboalkoxy, carboaroxy radicals, including those radicals in which one or more hydrogen atoms have been replaced by some substituent grouping, e. g., a halogen and X' is a member of the class consisting of halogen and aryl, carboalkoxy, carboaroxy, nitrile, and acyloxy radicals including substituted aryl, carboalkoxy, carboaroxy and acyloxy, e. g., halogen-substituted.

Illustrative examples of the radicals represented by X and X' in the above formula are alkyl, e. g., methyl, ethyl, propyl, isopropyl, butyl, isobutyl, amyl, isoamyl, hexyl, cyclopentyl, cyclohexyl, methylcyclopentyl, methylcyclohexyl, benzyl, phenethyl, etc., aryl, e. g., phenyl, tolyl, xylyl, xenyl, naphthyl, ethylphenyl, methylnaphthyl, etc., carboalkoxy, e. g., carbomethoxy, carboethoxy, carbopropoxy, carbobutoxy, carboisobutoxy, carbocyclopentoxy, carbocyclohexoxy, carbochloroethoxy, carbobromocyclopentoxy, etc., carboaroxy, e. g., carbophenoxy, carbotoloxy, carboxyloxy, carbonaphthoxy, carboxenoxy, carbofluorophenoxy, etc., acyloxy, e. g., acetoxy, propionoxy, butyroxy, isobutyroxy, cyclopentanoxy, cyclohexanoxy, benzo-oxy, toluoxy, naphthooxy, phenacetoxy, phenpropionoxy, chloropropionoxy, bromocyclopentanoxy, fluorobenzo-oxy, iodotoluoxy, etc., and homologues of the foregoing radicals.

Illustrative examples of the compounds which I may use to prepare the soluble, fusible copolymers of divinyl benzene are: vinyl halides, e. g., vinyl chloride, vinylidene chloride, vinyl bromide, vinyl iodide, vinylidene bromide, etc., acrylic acids, e. g., acrylic acid, methacrylic acid, chloroacrylic acid, bromoacrylic acid, etc., esters of acrylic acid, e. g., methyl acrylate, methyl methacrylate, ethyl acrylate, ethyl methacrylate, methyl chloroacrylate, propyl acrylate, isopropyl acrylate, butyl acrylate, isobutyl acrylate, isobutyl methacrylate, bromoisobutyl acrylate, benzyl phenyl acrylate, fluorophenyl acrylate, benzyl acrylate, benzyl methacrylate, ethyl chloroacrylate, etc., aryl ethylenes, e. g., styrene, methyl styrene, tolyl ethylene, bromotolyl ethylene, etc., vinyl esters, e. g., vinyl acetate, vinyl propionate, vinyl butyrate, vinyl isobutyrate, vinyl valerate, vinyl cyclopentanoate, vinyl cyclohexanoate, vinyl benzoate, vinyl methylbenzoate, etc., nitrile derivatives of acrylic acid, e. g., acrylonitrile, methacrylonitrile, etc., malonic acids and esters of malonic acids, e. g., methylene malonic acid, monomethyl ester, monoethyl ester, monopropyl ester, monobutyl ester, dimethylester, diethyl ester, dipropyl ester, monophenyl ester, diphenyl ester, etc., and homologues of the above radicals and their related compounds.

In order that those skilled in the art may better understand the teachings of the invention the following examples are given.

*Example 1*

Gelation times were determined for a solution of divinyl benzene in diethyl benzene for increasing concentrations of vinyl acetate.

| Parts of 23% sol'n | Divinyl benzene | Vinyl acetate | Benzoyl peroxide | Gelation time |
|---|---|---|---|---|
| | Parts | Parts | Parts | Minutes |
| 217 | 50 | | 0.50 | 17 |
| 217 | 50 | 5 | 0.50 | 30 |
| 108 | 25 | 25 | 0.25 | 60 |
| 108 | 25 | 75 | 0.50 | 240 |

The inhibiting effect of vinyl acetate is readily seen from the foregoing chart.

In order to isolate the soluble, fusible partial polymer from any of the above compositions the reflux times in each case are reduced sufficiently to prevent gelation. The viscous solution of the partial polymer is poured into methanol and the precipitate removed, dried and ground. The product so obtained is soluble in the usual hydrocarbon solvents and completely fusible. The polymerizate contains some vinyl acetate interpolymerized with divinyl benzene partial polymer.

*Example 2*

I may also make a partial copolymer using a composition of the type:

Parts by weight
Styrene ------------------------------------- 50
Divinyl benzene (217 parts of 23% solution in diethyl benzene) -------------------- 50
Benzoyl peroxide ---------------------------- 0.5 which ingredients are refluxed short of gelation, the polymer precipitated and isolated as in Example 1.

In preparing the heat-convertible, soluble, fusible copolymers of divinyl benzene, I may likewise use auxiliary inhibiting materials such as carbon tetrachloride, copper, sulfur, hydroxyl compounds, amines, as disclosed in my copending application Serial No. 448,158, filed concurrently herewith, now U. S. Patent 2,363,836, issued Nov. 28, 1944, or certain allyl derivatives, for example, their alcohols, aldehydes, ketones, esters, etc., many examples of which are given in my copending application Serial No. 448,155, now U. S. Patent 2,378,195, issued June 12, 1945, both applications being assigned to the same assignee as the present invention. Typical examples are given below.

*Example 3*

Parts by weight
Divinyl benzene (196 parts of 23% solution in diethyl benzene) ---------------- 45
Styrene ------------------------------------- 5
Allyl chloride ------------------------------ 45
Benzoyl peroxide ---------------------------- 0.25

The above ingredients were heated at the boiling point of the reacting mixture for 55 minutes. The solution containing the partial polymer was poured into methanol. The product was triturated, dried and ground. When submitted to a hot plate test at 140° C., the partial polymer was easily fusible.

Example 4

| | Parts by weight |
|---|---|
| Styrene | 2.5 |
| Divinyl benzene (206 parts of 23% solution in diethyl benzene) | 47.5 |
| Allyl acetate | 47.5 |
| Benzoyl peroxide | 0.25 |

The above ingredients were refluxed for 35 minutes. The product was precipitated by pouring the viscous solution into methanol, thoroughly triturated, and ground. The partial polymer flowed readily when placed on a hot plate at 140° C.

Example 5

| | Parts by weight |
|---|---|
| Styrene | 12.5 |
| Divinyl benzene (163 parts of 23% solution in diethyl benzene) | 37.5 |
| Allyl alcohol | 37.5 |
| Benzoyl peroxide | 0.25 |

The above ingredients were heated at the reflux temperature for 40 minutes. The partial polymer was precipitated by pouring the viscous solution into methanol. The product was triturated, dried and ground. At the temperature of the hot plate, e. g., 140° C., the resin was easily fusible.

Example 6

| | Parts by weight |
|---|---|
| Styrene | 75 |
| Divinyl benzene (109 parts of 23% solution in diethyl benzene) | 25 |
| Methallyl alcohol | 25 |
| Benzoyl peroxide | 0.5 |

The above ingredients were heated at the boiling temperature of the reacting mixture for 20 minutes. The partial polymer was precipitated by pouring the viscous solution into methanol. It was then triturated, dried and ground. The polymer was fusible at 140° C. on the hot plate.

Example 7

| | Parts by weight |
|---|---|
| Styrene | 90 |
| Divinyl benzene (43.5 parts of 23% solution in diethyl benzene) | 10 |
| Methallyl alcohol | 10 |
| Benzoyl peroxide | 0.50 |

The above ingredients were heated at the reflux temperature of the reacting mixture for a period of 15 minutes. The partial polymer was separated from the solvent by pouring the viscous solution into methanol. The precipitated product was triturated, dried and ground. The usual fusibility was displayed on the hot plate at 140° C.

What I claim as new and desire to secure by Letters Patent of the United States is:

1. The heat-convertible, fusible, partially co-polymerized product produced in accordance with claim 2.

2. The process which comprises polymerizing a composition comprising a solution of divinyl benzene in a dialkyl benzene having at least two carbon atoms in each alkyl grouping, in the presence of both vinyl acetate and a catalyst for the polymerization, for a period less than required to cause gelation of the solution, and isolating the heat-convertible, fusible, partially polymerized product, the vinyl acetate and divinyl benzene being present in the said solution in an amount, by weight, corresponding to from 5 to 75 parts of the former to from 50 to 25 parts of the latter.

3. The process which comprises polymerizing, under heat, divinyl benzene in a diethyl benzene solution in the presence of benzoyl peroxide and vinyl acetate for a period of time less than required to cause gelation of the solution, the vinyl acetate and divinyl benzene being present in the said solution in an amount, by weight, corresponding to from 5 to 75 parts of the former to from 50 to 25 parts of the latter, and thereafter isolating the heat-convertible, fusible, partial polymer of divinyl benzene so produced.

GAETANO F. D'ALELIO.